(12) United States Patent
Wheatley

(10) Patent No.: US 10,786,951 B2
(45) Date of Patent: Sep. 29, 2020

(54) METHOD OF MAKING A FIBER REINFORCED HOOP AND ANCHORS FOR A CONCRETE REINFORCEMENT STRUCTURE

(71) Applicant: Donald E. Wheatley, Holland, MI (US)

(72) Inventor: Donald E. Wheatley, Holland, MI (US)

(*) Notice: Subject to any disclaimer, the term of this patent is extended or adjusted under 35 U.S.C. 154(b) by 415 days.

(21) Appl. No.: 15/404,491

(22) Filed: Jan. 12, 2017

(65) Prior Publication Data

US 2017/0217108 A1    Aug. 3, 2017

Related U.S. Application Data

(60) Provisional application No. 62/288,149, filed on Jan. 28, 2016.

(51) Int. Cl.
*B29C 70/32* (2006.01)
*E04C 3/28* (2006.01)
*E04C 5/07* (2006.01)
*B29C 70/54* (2006.01)
*E04C 3/36* (2006.01)
*E04C 5/16* (2006.01)
*E04C 3/29* (2006.01)

(52) U.S. Cl.
CPC ............ *B29C 70/32* (2013.01); *B29C 70/545* (2013.01); *E04C 3/28* (2013.01); *E04C 3/285* (2013.01); *E04C 3/29* (2013.01); *E04C 3/36* (2013.01); *E04C 5/07* (2013.01); *E04C 5/168* (2013.01)

(58) Field of Classification Search
CPC .............................. B29C 70/32; B29C 70/545

USPC ......................................................... 264/138
See application file for complete search history.

(56) References Cited

U.S. PATENT DOCUMENTS

| | | | | |
|---|---|---|---|---|
| 2,898,258 A * | 8/1959 | Meier | .................... | E04B 1/2612 |
| | | | | 52/309.2 |
| 3,533,203 A * | 10/1970 | Fischer | ...................... | E04C 5/08 |
| | | | | 52/223.14 |
| 5,768,847 A * | 6/1998 | Policelli | .................. | B29C 53/66 |
| | | | | 156/172 |
| 8,002,926 B2 * | 8/2011 | Graham | .................. | B29C 33/04 |
| | | | | 156/169 |
| 9,885,181 B2 * | 2/2018 | St-Cyr | ...................... | E04C 5/07 |
| 2012/0138216 A1 * | 6/2012 | Kerrigan | ............... | B29C 53/821 |
| | | | | 156/189 |
| 2012/0222985 A1 * | 9/2012 | Kenney | ................. | B29C 53/562 |
| | | | | 206/524.6 |

(Continued)

*Primary Examiner* — Peter L Vajda
*Assistant Examiner* — Russell E Sparks
(74) *Attorney, Agent, or Firm* — Harness, Dickey & Pierce, P.L.C.

(57) ABSTRACT

A method of making a fiber reinforced hoop includes forming two plates having a face opposing one another and defining an outer periphery with a recessed groove to define a channel between the two plates. Fibrous strands coated with an adhesive are wrapped around the two plates within the channel a plurality of times. The adhesive is allowed to cure so that the fibrous strands form a rigid hoop. In a particular embodiment, the two plates are connected to a rotary spindle to rotate the two plates a plurality of times as the fibrous strands are fed into the channel. In a still further embodiment, multiple plate sets can be mounted to rotate with the spindle and fibrous strands can be wound into the channels in each of the plate sets so that multiple hoops can be formed and cured simultaneously.

20 Claims, 4 Drawing Sheets

(56) References Cited

U.S. PATENT DOCUMENTS

2015/0113886 A1\* 4/2015 Chang .................. E04G 21/185
52/105

\* cited by examiner

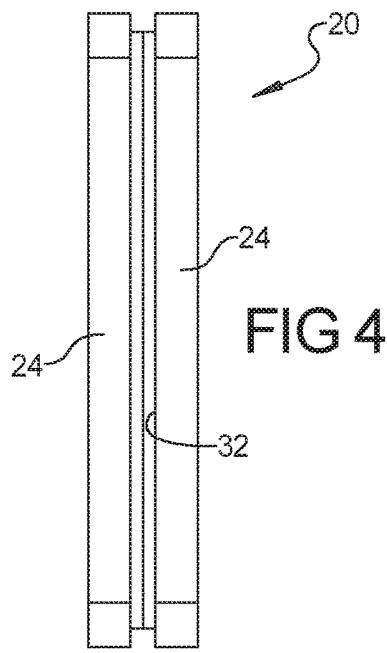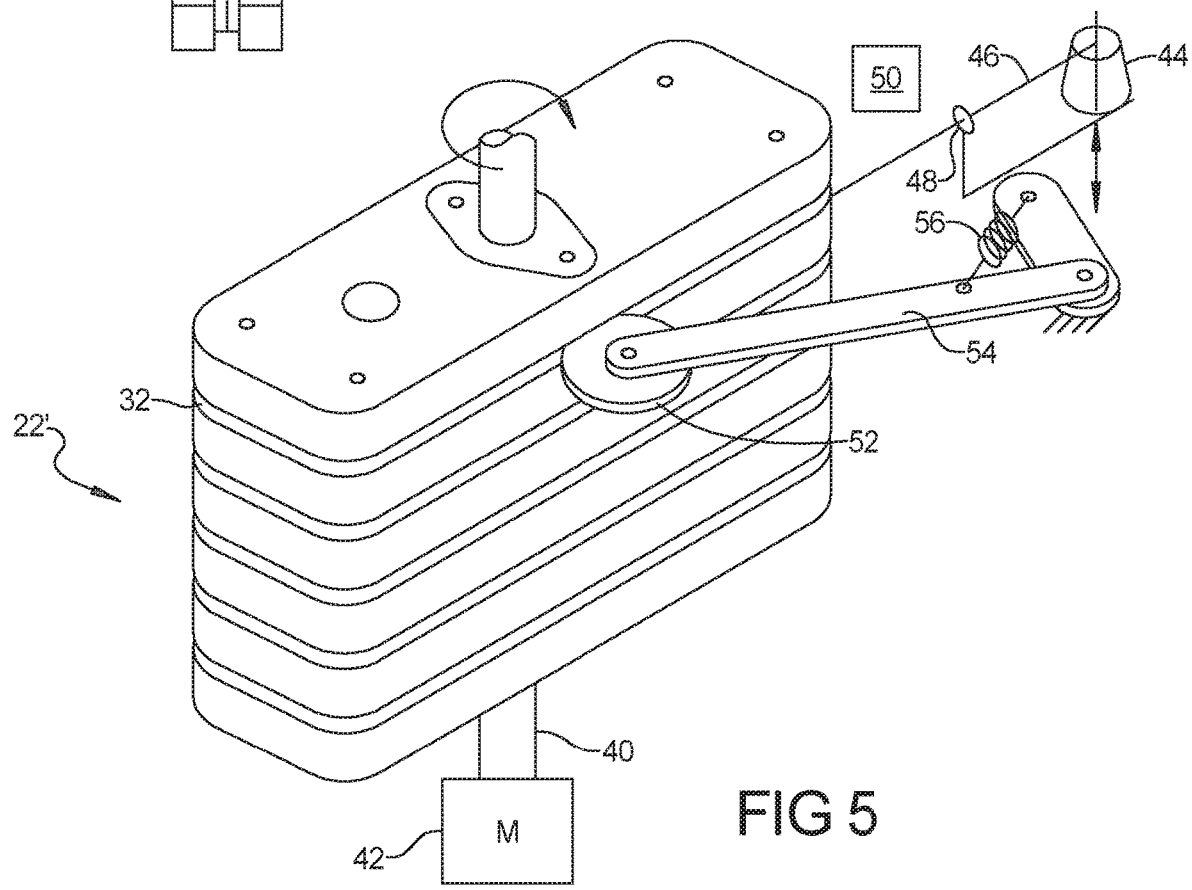

METHOD OF MAKING A FIBER REINFORCED HOOP AND ANCHORS FOR A CONCRETE REINFORCEMENT STRUCTURE

CROSS-REFERENCE TO RELATED APPLICATIONS

This application claims the benefit of U.S. Provisional Application No. 62/288,149, filed on Jan. 28, 2016. The entire disclosure of the above application is incorporated herein by reference.

FIELD

The present disclosure relates to a method of making a fiber reinforced hoop and anchors for a concrete reinforcement structure.

BACKGROUND AND SUMMARY

This section provides background information related to the present disclosure which is not necessarily prior art.

Concrete structures such as columns and beams are often reinforced with reinforcement bars or rods commonly referred to as rebar or re-rod. The reinforcement bars or rods can be formed into a grid or other framework around which the concrete is poured.

One problem with reinforcement bars or rods that are made from metal is that they are susceptible to rusting when exposed to water and salts. Therefore, it is desirable to use other materials such as fiberglass and carbon fibers, that are not susceptible to corrosion, to reinforce a concrete structure. A reinforcement structure that has been proposed for reinforcing concrete columns or beams includes a plurality of bars that are secured to a plurality of longitudinally spaced hoops formed from carbon or fiberglass fibers. The combined frame structure can be formed in a rectangular or square box shape or cylinder-shape as desired.

The present disclosure provides a method of making a fiber reinforced hoop for the concrete reinforcement structure. The method of making a fiber reinforced hoop includes forming two plates having a face opposing one another and each having an outer periphery with a recessed groove at a side edge that face one another to define a channel between the two plates. Fibrous strand coated with an adhesive is wrapped around the two plates within the channel a plurality of times. The adhesive is allowed to cure so that the fibrous strands form a rigid hoop. In a particular embodiment, the two plates are connected to a rotary spindle to rotate the two plates a plurality of times as the fibrous strands are fed into the channel. In a still further embodiment, multiple plate sets can be mounted to rotate with the spindle and fibrous strands can be wound into the channels in each of the plate sets so that multiple hoops can be formed and cured simultaneously.

According to yet another aspect of the present disclosure, the hoop structure formed according to the present disclosure can be formed as a square or rectangular hoop that can be cut into halves to form two U-shaped anchors that can be used as an anchor for fiber reinforcement strips that are adhered to a concrete structure such as disclosed in commonly assigned U.S. Pat. No. 9,290,956, which is herein incorporated by reference in its entirety.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a side plan view of the assembled fixture assembly shown in FIG. 3;

FIG. 5 is a perspective view of a hoop forming set up used for making and curing multiple hoops simultaneously;

Corresponding reference numerals indicate corresponding parts throughout the several views of the drawings.

DETAILED DESCRIPTION

Figure 1:
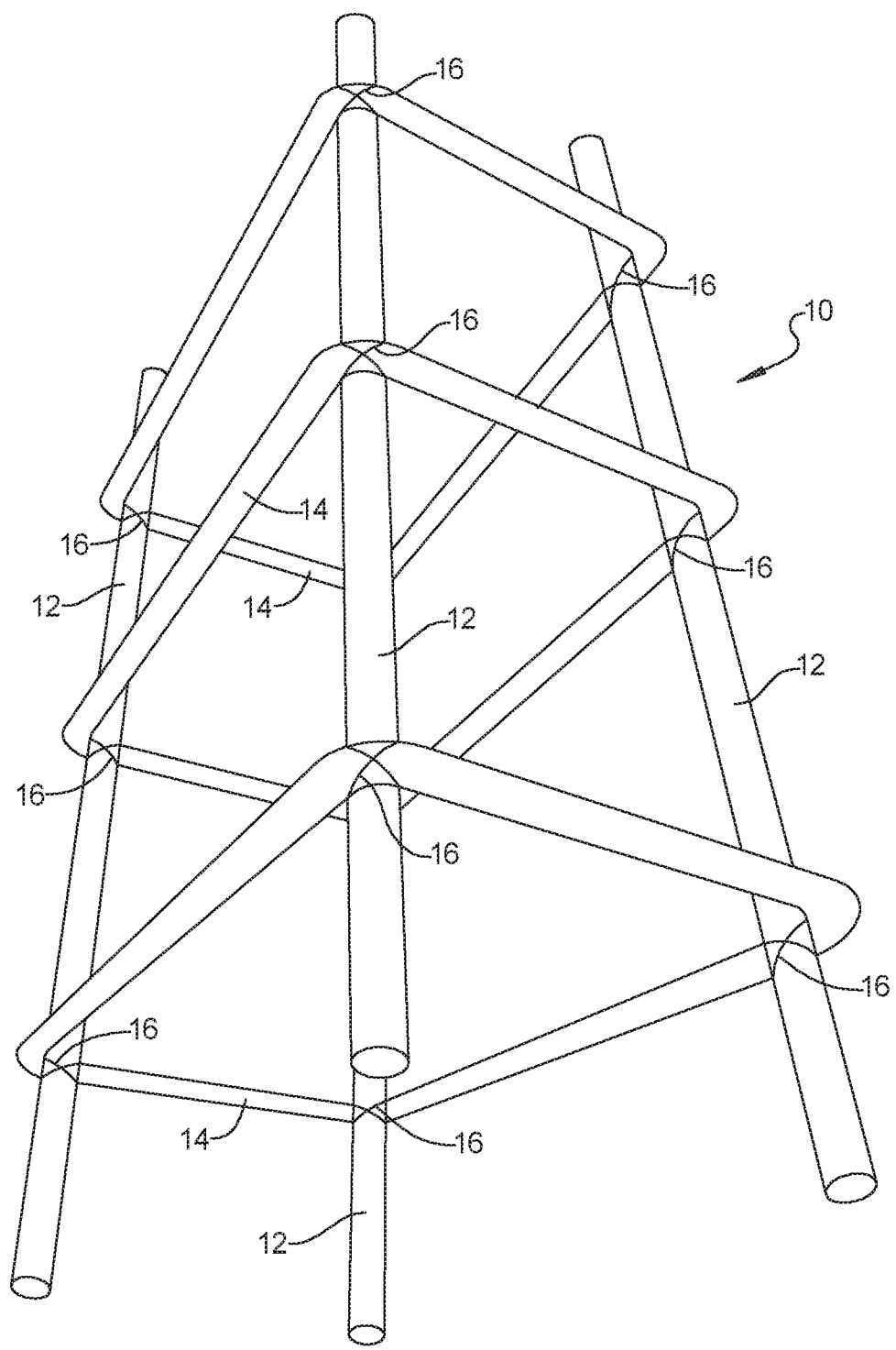
FIG. 1 is a perspective view of an exemplary concrete column reinforcement structure according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

With reference to FIG. 1, an exemplary concrete reinforcement structure 10 is shown that is designed to be embedded in a concrete structure such as a column or beam. The reinforcement structure 10 can include a plurality of rods 12 that extend generally parallel to one another and are secured to a plurality of fiber reinforced hoops 14 by ties 16. The fiber reinforced hoops 14 can include carbon, graphite, fiberglass or other fiber strands bunched together as a tow of fibers. The rods 12 can be formed from various materials and in particular, fiberglass, carbon fibers and graphite fibers that are formed coated with an adhesive and formed in a rod shape and cured to a rigid form. The rods 12 can also be formed from metal such as steel or aluminum. The ties 16 can be in the form of zip ties or other forms of connectors for securing the rods 12 to the hoops 14 at desired locations.

Figure 2:
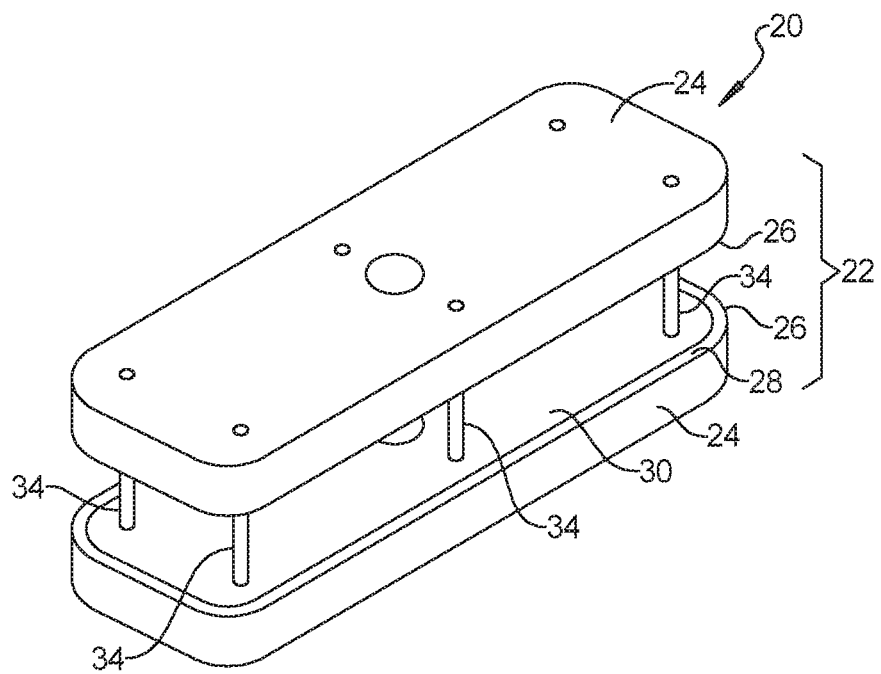
FIG. 2 is an exploded perspective view of a fixture assembly used for forming fiber reinforced hoops for the reinforcement structure according to the principles of the present disclosure.
Figure 3:
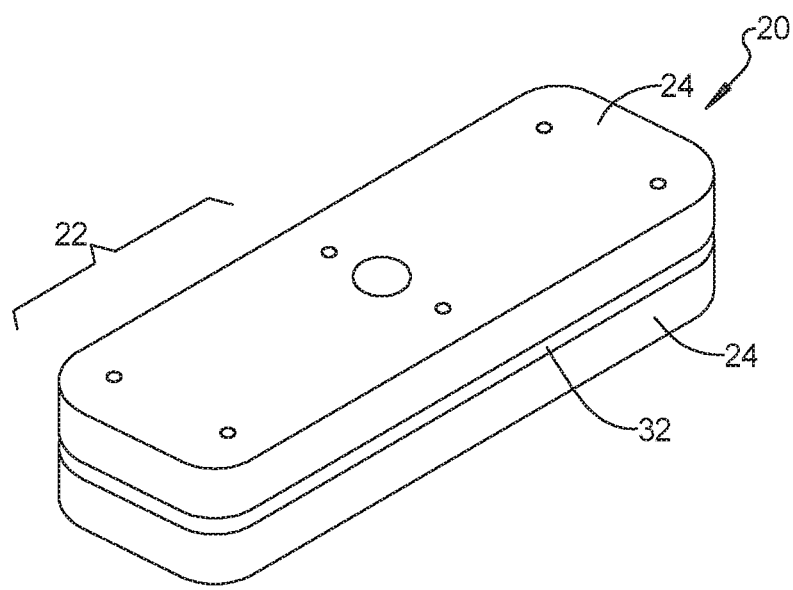
FIG. 3 is a perspective view of the assembled fixture assembly of FIG. 2.

The present disclosure provides a method of forming the hoops 14. The method includes using a fixture 20 including a plate assembly 22 including, for example, first and second plates 24, as shown in FIGS. 2-4. The first and second plates 24 each include an outer periphery edge 26 defining a recessed groove 28. The first and second plates 24 also include opposing faces 30 which can be brought into engagement with one another as shown in FIG. 3 so as to define a channel 32 around the periphery of the plate assembly 22. The plates 24 can be aligned with one another via dowel pins 34 that can be received in respective apertures in the first and second plates 24. The shapes of the plates 24 can be selected to have a desired hoop shape in, for example, a square, rectangular, circular, oval, or other desired shape. As shown in FIG. 5, multiple plates 24' can be provided in a stacked relationship in order to define multiple channels 32 in the stacked assembly 22'. A spindle 40 can be engaged with the plate assembly 22, 22' and driven by a motor 42 to rotate the plate assembly 22, 22'.

Figure 6:
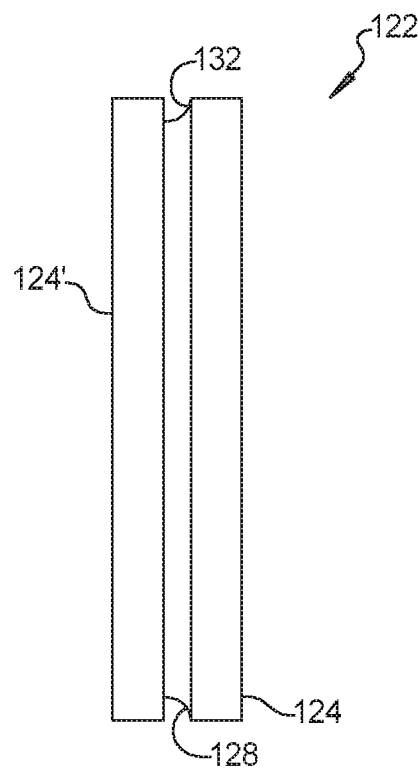
FIG. 6 is a side plan view of an alternative fixture assembly.

According to a still further alternative embodiment as shown in FIG. 6, the plate assembly 122 can be provided with a recessed groove 128 being formed in only one plate 124 and the other plate 124' being flat to define only a sidewall of the channel 132.

Figure 7:
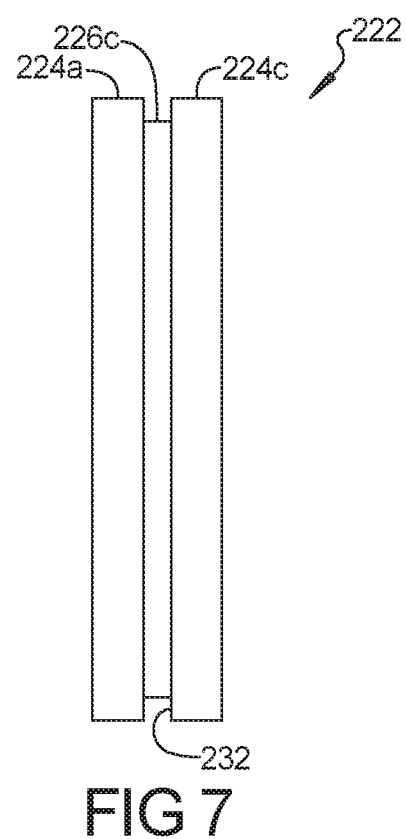
FIG. 7 is a side plan view of a further alternative fixture assembly.

In another alternative embodiment as shown in FIG. 7, the plate assembly 222 can utilize multiple plates 224a-c or other components in a stacked relationship to define the channel 232. In particular, as shown, the outer plates 224a, 224c can be formed as flat plates and the center component 224b can be smaller in size than the outer plates 224a, 224c so that the outer surface of the center component 224b defines an inner surface of the channel 232 and the opposing surfaces of the outer plates 224a, 224c define the sidewalls of the channel. The outer periphery surface of the center component 224b can define the shape of the hoop 14 and can be in a form of a plate or ring that is sandwiched between the outer plates 224a, 224c. Other alternative members can be used to define the channel 32 around which the fibrous strands are wrapped. In particular, ring segments, pins and other members can be used to define the channel 32 in which the fibrous strands are wrapped.

A feed spool 44 including carbon, fiberglass or other fibrous strands 46 can be aligned with a guide member 48 that guides the strands 46 to a channel 32, 132, 232 formed in the plate assembly 22, 22', 122, 222. The strands 46 can be pre-coated with an adhesive coating that is uncured within the feed spool. Alternatively, an adhesive coating device 50 can be utilized for coating the strands 46 with a hardenable saturate such as an adhesive or an epoxy prior to, during or after wrapping the strands around the plate assembly 22, 22'. The motor 42 can be utilized to drive the spindle 40 and plate assembly 22, 22' in a rotary direction to wind the strands 46 in the channel 32 a predetermined number of times so as to form the desired hoop shape. The coating device 50 can be in the form of a sprayer, bath or other device that can inject the hardenable saturate onto the strands 46 either prior to or after wrapping the strands into the channel 32. A roller 52 can be optionally provided on an arm 54 loaded by a spring 56 that guides the roller 52 along the channel 32 to pack the strands 46 securely into the channel 32. The roller 52 can be sized to be slightly narrower than the channel 32 so that it rolls freely along the channel while the spring 56 biases the arm 54 so that the roller is pressed tightly against the strands 46 within the channel 32.

It is anticipated that the feed spool 44 and guide member 48 can be indexed from one channel 32 to the next and the motor can then be driven again to rotate the plate assembly 22, 22' a predetermined number of times to form a second hoop. This process can be repeated to form a fiber reinforced hoop 14 within each channel 32 so that multiple fiber reinforced hoops 14 can be formed and cured simultaneously. The strand 46 that connects each hoop 14 can be trimmed either before or after the adhesive has cured. Alternatively, a feed spool 44 can be provided for each channel 32 so that all of the hoops 14 can be formed simultaneously from different feed spools.

Figure 8:
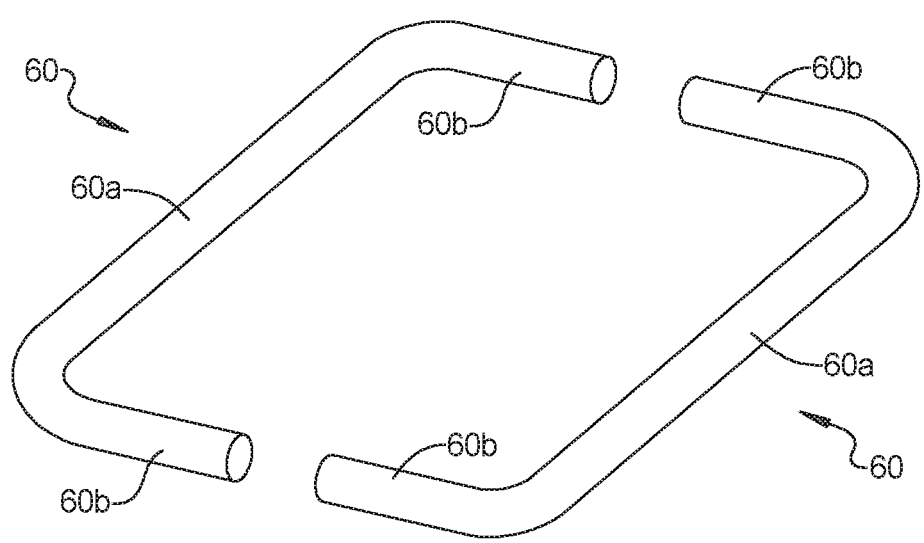
FIG. 8 is a perspective view of an anchor formed according to the method of the present disclosure.

The hoops 14 made from carbon fiber strands or other fibers can be used in the reinforcement structure 10, as shown in FIG. 1. As shown in FIG. 8, the hoops 14 made according to the present disclosure can be cut into halves to form two U-shaped anchors 60 having a bridge portion 60a and two legs 60b extending from ends of the bridge portion 60a.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of reinforcing concrete comprising:
forming two or more members stacked together to define a channel along an outer periphery of the two or more members;
wrapping fibrous strands within the channel a plurality of times, the fibrous strands being coated with a hardenable saturate;
allowing the saturate to harden so that the fibrous strands form a fibrous rigid hoop;
removing the fibrous rigid hoop from the channel; and
forming concrete around the fibrous rigid hoop.

2. The method according to claim 1, wherein the two or more members are connected to a rotary spindle to rotate the two or more members a plurality of times as the fibrous strands are fed into the channel.

3. The method according to claim 2, wherein multiple sets of two or more stacked members are mounted to rotate with the spindle and the fibrous strands can be wound into the channels in each of the sets of two or more stacked members so that multiple hoops can be formed simultaneously.

4. The method according to claim 1, wherein the hardenable saturate can be applied to the fibrous strands before or after the fibrous strands are wrapped within the channel.

5. The method according to claim 1, wherein the two or more stacked members include two or more plates.

6. A method of reinforcing concrete comprising:
wrapping fibrous strands within a channel a plurality of times, the fibrous strands being coated with a hardenable saturate;
allowing the saturate to harden so that the fibrous strands form a fibrous rigid hoop;
removing the fibrous rigid hoop from the channel; and
forming concrete around the fibrous rigid hoop.

7. The method according to claim 6, wherein the channel is connected to a rotary spindle to rotate the channel a plurality of times as the fibrous strands are fed into the channel.

8. The method according to claim 7, wherein multiple channels are mounted to rotate with the spindle and the fibrous strands can be wound into the multiple channels so that multiple hoops can be formed simultaneously.

9. The method according to claim 6, wherein the hardenable saturate can be applied to the fibrous strands before or after the fibrous strands are wrapped within the channel.

10. The method according to claim 6, wherein two or more stacked members define the channel.

11. A method of making a rigid fiber anchor comprising:
forming two or more members stacked together to define a channel along an outer periphery of the two or more members;
wrapping fibrous strands within the channel a plurality of times, the fibrous strands being coated with a hardenable saturate;
allowing the saturate to harden so that the fibrous strands form a rigid hoop;
cutting the rigid hoop in half to form two U-shaped anchors having a straight elongated bridge portion and two parallel legs extending from opposite ends of the bridge portion; and
wherein the U-shaped anchors are adhered to a concrete structure.

12. The method according to claim 11, wherein the two or more members are connected to a rotary spindle to rotate the two or more members a plurality of times as the fibrous strands are fed into the channel.

13. The method according to claim 12, wherein multiple sets of members are mounted to rotate with the spindle to define a plurality of channels and the fibrous strands can be wound into the plurality of channels in each of the sets of members so that multiple hoops can be formed simultaneously.

14. The method according to claim 11, wherein the hardenable saturate can be applied to the fiber strands before or after the fiber strands are wrapped within the channel.

15. The method according to claim 11, wherein the two or more stacked members include two or more plates.

16. A method of making a rigid fiber anchor comprising:
wrapping fibrous strands within a channel a plurality of times, the fibrous strands being coated with a hardenable saturate;
allowing the saturate to harden so that the fibrous strands form a rigid hoop;
cutting the rigid hoop in half to form two U-shaped anchors having a straight elongated bridge portion and two parallel legs extending from opposite ends of the bridge portion; and
wherein the U-shaped anchors are adhered to a concrete structure.

17. The method according to claim 16, wherein the channel is connected to a rotary spindle to rotate the channel a plurality of times as the fibrous strands are fed into the channel.

18. The method according to claim 17, wherein multiple sets of channels are mounted to rotate with the spindle and the fibrous strands can be wound into the channels so that multiple hoops can be formed simultaneously.

19. The method according to claim 16, wherein the hardenable saturate can be applied to the fibrous strands before or after the fibrous strands are wrapped within the channel.

20. The method according to claim 16, wherein the channel is formed by two or more stacked members.

* * * * *